No. 682,219. Patented Sept. 10, 1901.
M. MOSKOWITZ.
ELECTRIC REGULATOR.
(Application filed Sept. 27, 1900.)
(No Model.)
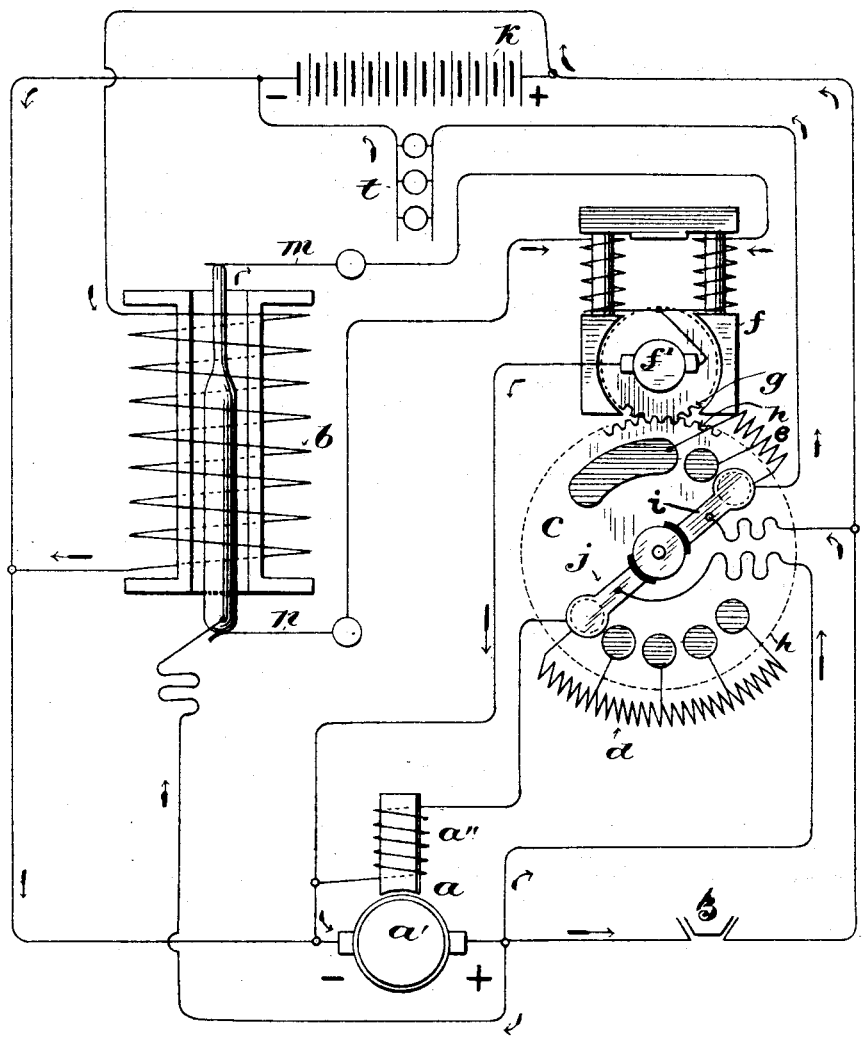

UNITED STATES PATENT OFFICE.

MORRIS MOSKOWITZ, OF NEW YORK, N. Y., ASSIGNOR TO JAMES H. YOUNG, TRUSTEE, OF SAME PLACE.

ELECTRIC REGULATOR.

SPECIFICATION forming part of Letters Patent No. 682,219, dated September 10, 1901.

Application filed September 27, 1900. Serial No. 31,224. (No model.)

*To all whom it may concern:*

Be it known that I, MORRIS MOSKOWITZ, electrical engineer, of the city of New York, State of New York, (whose post-office address is New Kirk avenue and Twenty-second street, Brooklyn, New York,) have invented certain new and useful Improvements in Electric Regulators, of which the following is a description accompanied by a drawing.

The invention is particularly useful for circuits deriving current from a generator that is liable to variations in speed or in any other of its conditions, as the object that the invention accomplishes is the maintaining of any one constant condition in such circuit by suitably regulating and controlling the generator.

The lighting of railway-cars by current derived from a generator that is driven from the car-axle is one instance where the invention is especially useful.

In the accompanying diagrammatic drawing the application of the invention to such a lighting system is shown as arranged for constant potential, and from this the application of the invention to other systems where either constant potential or constant current are to be derived from a variable source will be readily apparent to electricians.

The generator driven under variable speeds is marked $a$, its armature $a'$, and its field-magnet $a''$. At $b$ is a solenoid connected across the brushes of the generator or across the battery. At $c$ is a rheostat, preferably having two independent sets of resistance-coils and their respective sliding contact-arms $i$ and $j$, insulated from each other. The coil $e$ is a resistance-coil of very heavy wire capable of carrying the entire working current. The coil $d$ is of fine wire intended to carry only the field-magnet-exciting current of generator $a$. At $f$ is a small motor. Its armature $f'$ rotates in either direction, turning a pinion $g$, which meshes with a gear-wheel $h$, connected to turn the two rheostat-arms $i$ and $j$. The storage battery (if provided) is included, as at $k$. The work-circuit or lamp-circuit is at $t$. Now assuming that the voltage of the generator is designed for a certain minimum speed, the generator being driven (for example) from a car-axle at varying speeds, and that its circuit has been closed at $z$, when that speed (say fifteen miles per hour) has been reached then its exciting-current passes from the positive brush of the commutator $a'$ to the contact-arm $i$ of the rheostat $c$, thence through the field-coils $a''$, and back to the negative brush of the generator, and the main current now flows from the positve brush of the generator to the rheostat-arm $j$, and thence into the work-circuit or lamps and back to the negative brush of the generator. Charging-current also flows from the positive brush of the armature $a'$, through the storage battery $k$, and back to the negative brush. Now when the speed of the car exceeds fifteen miles per hour the corresponding increase in the speed of the generator-armature would raise its voltage if the automatic regulator did not insert resistance in the generator field-coils $a''$. This occurs in the following manner: The solenoid $b$ is connected to the brushes of the generator, as shown, and its core makes contact with the two spring contact-arms $m$ and $n$, which connect, respectively, to opposingly-wound field-coils on the motor $f$. The other ends of these two field-coils are both connected to one brush of the generator $a$, either in series with the motor-armature, as shown, or in shunt. The solenoid-core is connected to the other brush of the generator, so that current flows through the armature $f'$ and both opposing field-coils of the motor $f$ when the solenoid-core touches both contact-arms $m$ and $n$ and the motor $f$ is not actuated. The solenoid-core is so placed or adjusted that the standard or normal voltage desired at the generator $a$ will maintain it in contact with both arms $m$ and $n$; but when the voltage rises even a little above the normal voltage the core rises and breaks contact at $n$, thereby at once actuating the motor $f$ and causing it to adjust the rheostat-arm $i$, and thereby gradually introduce resistance into the field-circuit $a''$ of the generator until the standard voltage is again established and the circuit at $n$ closed. If, on the other hand, the voltage thereafter falls, the core of the solenoid $b$ drops, breaking the contact at $m$ and causing the resistance to be decreased in the circuit of the field-coils $a''$ until the standard voltage is again established. Thus the voltage is maintained at the desired standard.

The same solenoid $b$ and motor $f$ actuate the switch-arm $j$, which may be utilized to increase the resistance at $h$ in the lamp-circuit $t$ when the voltage rises and reduce it when it falls below the standard. Such a series resistance between the generator and the lamps is especially desirable when a storage battery $k$ is used to discharge current through the lamps when the generator is cut out and to be charged by the generator when the generator is running at sufficient speed to effect the charging.

I am of course aware that if the controlling-solenoid should be included in series instead of shunt to the work-circuit or lamp-circuit it would act to maintain the current constant instead of the potential and also that introducing resistance in the field-coils of the generator is not the only well-known way of controlling the potential.

I contemplate the use of well-known equivalents wherever they may be suggested or desirable to suit special conditions, although at present I prefer to employ a resistence for the field-controller or regulating device for the generator and a small motor as an electrodynamic means of adjusting such controller and a solenoid and contacts $m$ and $n$ as the best electrically-actuated means for making and breaking the circuits of the motor.

As one of the marked advantages of this preferred form of my invention it will be noticed that the circuits of the motor $f$ are never entirely interrupted and that injurious sparking is avoided.

What I claim as the novel features are the following:

The combination with a generator, and with a work-circuit adapted to be supplied therefrom, of a current-regulating device included in circuit between the generator and the work-circuit, electrodynamic adjusting mechanism for the regulating device one member of which has opposed coils, circuit making and breaking devices for the said opposed coils, and electrically controlled and actuated means in circuit with the generator for operating the said circuit making and breaking devices, a storage battery and connections for charging it from the generator and discharging it into the work-circuit, and a switch for connecting and disconnecting the generator with the battery and the work-circuit, substantially for the purposes set forth.

Signed this 26th day of September, 1900.

MORRIS MOSKOWITZ.

Witnesses:
HENRY S. MORTON,
HAROLD BINNEY.